United States Patent
Shibata et al.

(10) Patent No.: US 7,636,738 B2
(45) Date of Patent: Dec. 22, 2009

(54) FILE MANAGEMENT APPARATUS, FILE MANAGEMENT METHOD, AND PROGRAM

(75) Inventors: Yoshiaki Shibata, Kanagawa (JP); Hisao Tanaka, Tokyo (JP); Takayoshi Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 11/788,130

(22) Filed: Apr. 19, 2007

(65) Prior Publication Data

US 2007/0250544 A1 Oct. 25, 2007

(30) Foreign Application Priority Data

Apr. 21, 2006 (JP) ............................. 2006-118518

(51) Int. Cl.
*G06F 17/30* (2006.01)

(52) U.S. Cl. .................. 707/200; 707/203; 715/229

(58) Field of Classification Search ................. None
See application file for complete search history.

(56) References Cited

U.S. PATENT DOCUMENTS

| 5,124,937 A | 6/1992 | Uchiike et al. |
| 5,806,072 A | 9/1998 | Kuba et al. |

FOREIGN PATENT DOCUMENTS

| EP | 1 367 491 | 12/2003 |
| JP | 1-82187 | 3/1989 |
| JP | 1-315844 | 12/1989 |
| JP | 5-12341 | 1/1993 |
| JP | 6-153140 | 5/1994 |

OTHER PUBLICATIONS

Guy R G et al: "Name transparency in very large scale distributed file systems" Second IEEE Workshop on Experimental Distributed Systems, Oct. 11, 1990, pp. 20-25, XP01001162.
File Name Mapping in a Heterogeneous Distributed Environment IBM Technical Disclosure Bulletin, IBM Corp. New York, US, vol. 32, No. 10A, 1 Mar. 1990, pp. 456-462, XP000083401 ISSN: 0018-8689.

*Primary Examiner*—John R. Cottingham
*Assistant Examiner*—Noosha Arjomandi
(74) *Attorney, Agent, or Firm*—Frommer Lawrence & Haug LLP; William S. Frommer; Thomas F. Presson

(57) ABSTRACT

A file management apparatus that includes a table management section, a file name display control section, a file access control section, and a mode switching section. The mode switching section switches an operating mode between an arbitrary file name mode and a standard file name mode.

9 Claims, 10 Drawing Sheets

FIG. 3

| STANDARD FILE NAME | FILE IDENTIFIER | ARBITRARY FILE NAME |
|---|---|---|
| C0001 | 060A2B34...1 | Fuji |
| C0002 | 060A2B34...2 | Sakura |
| C0003 | 060A2B34...3 | Geisha |

FIG. 4

```
<?xml version="1.0"encoding="UTF-8"?>
<AliasList xmlns="..."...
    proavIdRef="2FD70800403405C1F894080046020118">
  <Alias original="C0001"target="060A2B34...1"value="Fuji"/>
  <Alias original="C0002"target="060A2B34...2"value="Sakura"/>
  <Alias original="C0003"target="060A2B34...3"value="Geisha"/>
</AliasList>
```

```
<?xml version="1.0"encoding="UTF-8"?>
<AliasList xmlns="..."...
    proavIdRef="2FD70800403405C1F894080046020118">
  <Alias original="C0001"target="060A2B34...1"value="Everest"/>
  <Alias original="C0002"target="060A2B34...2"value="Cherry"/>
  <Alias original="C0003"target="060A2B34...3"value="Dancer"/>
</AliasList>
```

FILE MANAGEMENT APPARATUS, FILE MANAGEMENT METHOD, AND PROGRAM

CROSS REFERENCES TO RELATED APPLICATIONS

The present invention contains subject matter related to Japanese Patent Application JP 2006-118518 filed in the Japan Patent Office on Apr. 21, 2006, the entire contents of which being incorporated herein by reference.

BACKGROUND OF THE INVENTION

1. Field of the Invention

The present invention relates to a file management apparatus, a file management method, and a program, and more specifically relates to a file management apparatus, a file management method, and a program, compatible to both a standard file name assigned according to the existing denomination rule and an arbitrary file name having a high degree of freedom.

2. Description of the Related Art

Among file management apparatuses based on the technology in the past, there are ones which automatically assign a file name (a standard file name) such as "Cxxxx.MXF" (xxxx: 0001 to 9999), when a file of various types of data such as video data is formed, to the file as a file name for the file. For instance, Japanese Patent Laid-Open No. Hei 5-12341 discloses a technique for automatically assigning a file name to a file based of a date of generation of the file to prevent the same file name from being used within a file system and also to enable omission of an operator's work for inputting a file name.

SUMMARY OF THE INVENTION

Among the file management apparatuses based on the technology in the past, there are also ones which allow and acknowledge only standard file names assigned according to the existing rule for denomination. In the file management apparatuses, data recording with a file name not following the denomination rule is rejected, and sometimes an application such as a personal computer (described as PC hereinafter) using a file is required to take charge for the work for file name management, or a user can not determine contents of a file from the file name. To overcome the problems as described above, now there is the strong need for development of a file management apparatus capable of treating a file name having a high degree of freedom (an arbitrary file name) like in a versatile storage device such as a hard disk drive (described as HDD hereinafter).

To generalize the problems as described above, it may be that currently the most important objective is to provide means for a file system capable of treating only a standard file name following the existing file denomination rule not allowing any freedom in denomination to cope with an arbitrary file name freely given by a use and allow for access to the file via the arbitrary file.

The present invention was made in the light of the circumstances as described above, and it is desirable to provide a novel and improved file management apparatus, a file management method, and a program each enabling a file system capable of treating only standard file names following the existing file denomination rule to allow for use of an arbitrary file name having a high degree of freedom and cope with direct use of the file system (standard file name mode) and correspondence to an arbitrary file name (arbitrary file name mode) without any contradiction.

In order to solve the problems described above, according to an embodiment of the present invention, a file management apparatus configured to enable a file system capable of treating only a file with a standard file name following the existing file denomination rule to allow for use of an arbitrary file name separately assigned to the file, and the file name management apparatus includes a table management section that manages a file name correspondence table in which correspondence between standard file names assigned to one or more files stored in a storage medium and arbitrary file names separately assigned to the files is described; a file name display control section that determines, when an external application displays a file name of a file stored in a storage medium, whether an arbitrary file name is assigned to the file based on the file name correspondence table, converts, when it is determined that an arbitrary file name is assigned to the file, a standard file name acquired from the file system to the arbitrary file name based on the file name correspondence table and displays the arbitrary file name, or displays the standard file name acquired from the file system as it is when it is determined that an arbitrary file name is not assigned to the file; a file access control section that gives an instruction for accessing to an access target file to the file system by using, when an external application accesses a file store in a storage medium and specifies an access target file with an arbitrary file name, a standard file name converted from the arbitrary file name based on the file name correspondence table, or by using, when the access target file is specified with a standard file name, the standard file name as it is; and a mode switching section that switches an operating mode between the arbitrary file name mode in which an arbitrary file name is acknowledged and the standard file name mode in which an arbitrary file name is not acknowledged by turning ON or OFF functions of the file name display control section and the file access control section.

With the configuration as described above, in the arbitrary file name mode, functions of the file name display control section and the file access control section are turned ON. Therefore, when a file name list for files stored in a storage medium is displayed, the file system reads out standard file names of the files stored in the storage medium and gives the standard file names to the file name display control section. The file name display control section converts standard file names each with an arbitrary file name assigned thereto among those acquired from the file system to the arbitrary file names based on the file name correspondence table, and give the arbitrary names to the external application. The external application displays the standard file names or the arbitrary file names acquired from the file name display control section on a display section. When accessing a file stored in the storage medium, an external application accesses the file based on the arbitrary file name or the standard file name. When an access target file has an arbitrary file name, the file access control section converts the arbitrary file name to a standard file name and gives instruction for accessing to the file system by using the standard file name generated by converting the arbitrary file name, and when the target access file has a standard file name, the file access control section gives an instruction for accessing to the file system by using the standard file name. The file system accesses a file having the standard file name acquired from the file access control section.

In the file correspondence table, standard file names and arbitrary file names assigned to files in the storage medium and file identifiers uniquely assigned to the files is described in the file name correspondence table, and the table management section determines whether a file corresponding to an arbitrary file name described in the file name correspondence table is present in the storage medium or not based on the file identifier described in the file name correspondence table as well as on a file identifier assigned to the filed stored in the storage medium.

The file name display control section notifies presence of the file name correspondence table to the external application in the arbitrary file name mode, but does not notify presence of the file name correspondence table to the external application, and the external application determines, based on presence or absence of the file name correspondence table, whether the operating mode is set in the arbitrary file name mode or in the standard file name mode.

When assignment of a new arbitrary file name to a file with a standard file name already assigned thereto is requested, the table management section correlates the standard file name and the arbitrary file name to each other and describes the correspondence in the file name correspondence table, and updates, when change of an arbitrary file name already assigned to a file is requested, the arbitrary file name described in the file name correspondence table, and deletes, when it is detected that a file having a standard file name or a file identifier described in the file name correspondence table is not present in the storage medium, descriptions relating to the file from the file name correspondence table.

The file name correspondence table can be accessed from an external application.

The file name correspondence table may be stored in the same storage medium in which files are stored. Furthermore, the storage medium may be a detachable removable storage medium on a file management apparatus.

In order to solve the problems as described above, according to another embodiment of the present invention provides, a file management method enabling a file system capable of treating only a file with standard file name following the existing file denomination rule to allow for use of an arbitrary file name separately assigned to the file, and the file management method including the steps of: managing a file name correspondence table between standard file names assigned to one or more files stored in a storage medium and arbitrary file names separately assigned to the files is described; switching between an arbitrary file name mode allowing for use of an arbitrary file name and a standard file name mode not allowing for use of an arbitrary file name; determining, when an external application displays a file name of a file stored in a storage medium in the arbitrary file name mode, whether an arbitrary file name has been assigned to the file or not based on the file name correspondence table, converting a standard file name acquired from the file system to the arbitrary file name based on the file name correspondence table and displaying the arbitrary file name, or displaying the standard file name acquired from the file system as it is when any arbitrary file name has been assigned to the file; and giving an instruction for accessing an access target file to the file system, when an external application accesses a file stored in the storage medium in the arbitrary file name mode, by using, when the access target file is specified with an arbitrary file name, a standard file name generated by converting the arbitrary file name based on the file name correspondence table, and by using, when the access target file is specified with a standard file name, the standard file name as it is.

In order to solve the problems as described above, according to yet another embodiment of the present invention provides, a program enabling a file system capable of treating only a file with standard file name following the existing file denomination rule to allow for use of an arbitrary file name separately assigned to the file, and the program enables a computer to function as: a table management section that manages a file name correspondence table in which correspondence between standard file names assigned to one or more files stored in a storage medium and arbitrary file names separately assigned to the files is described; a file name display control section that determines, when an external application displays a file name of a file stored in a storage medium, whether an arbitrary file name is assigned to the file based on the file name correspondence table, converts, when it is determined that an arbitrary file name is assigned to the file, a standard file name acquired from the file system to the arbitrary file name based on the file name correspondence table and displays the arbitrary file name, or displays the standard file name acquired from the file system as it is when it is determined that an arbitrary file name is not assigned to the file; a file access control section that gives an instruction for access to an access target file to the file system by using, when an external application accesses a file store in a storage medium and specifies an access target file with an arbitrary file name, a standard file name converted from the arbitrary file name based on the file name correspondence table, or by using, when the access target file is specified with a standard file name, the standard file name as it is; and a mode switching section that switches an operating mode between the arbitrary file name mode in which an arbitrary file name is acknowledged and the standard file name mode in which an arbitrary file name is not acknowledged by turning ON or OFF functions of the file name display control section and the file access control section.

As described above, with the present invention, in a file system capable of treating only standard file names following the existing file denomination rule, a user can freely assign an arbitrary file name to a file. Furthermore, the present invention allows for both a mode in which the file system is directly used (standard file name mode) and a mode in which an arbitrary file name is supported (arbitrary file name mode) without any contradiction.

BRIEF DESCRIPTION OF THE DRAWINGS

FIG. 3 is an explanatory view illustrating an example of a configuration of a file name correspondence table according to the embodiment;

FIG. 4 is an explanatory view illustrating an example of a description of a file name correspondence table according to the embodiment;

DETAILED DESCRIPTION OF THE PREFERRED EMBODIMENTS

Figure 1:
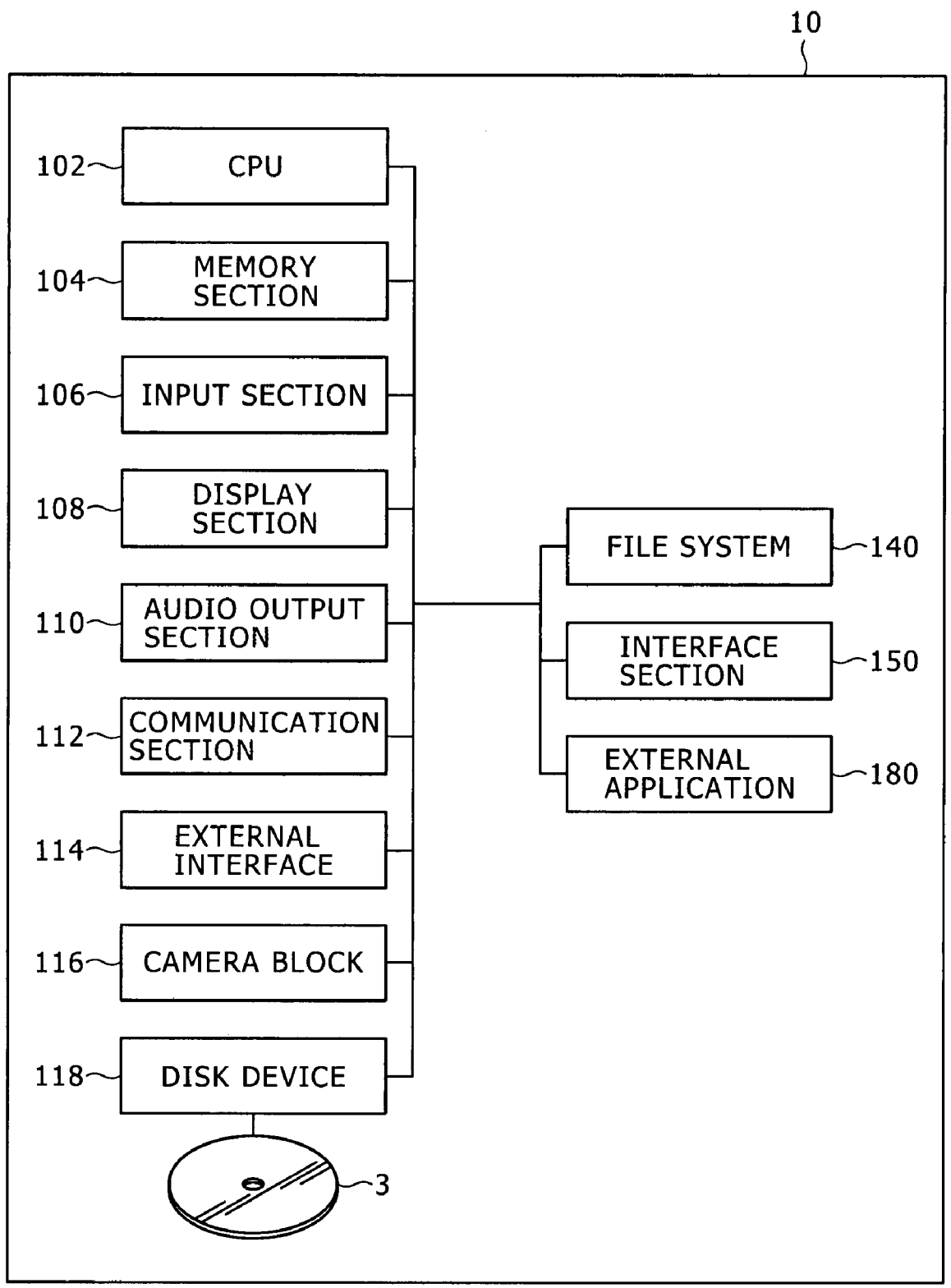
FIG. 1 is a block diagram illustrating a general configuration of an image pickup device as a file management apparatus according to a first embodiment of the present invention.

Preferable embodiments of the present invention are described in detail below with reference to the attached drawings. The same reference numerals are assigned to components having the substantially same function or configuration, and detailed descriptions thereof are omitted herefrom.

A file management apparatus according to a first embodiment of the present invention and a file management method using the file management apparatus are described in detail below. The following description assumed a case in which the file management apparatus according to the present invention is applied to an image pickup device, but the present invention is not limited to the example.

<1. General Configuration of a File Management Apparatus>

At first, an image pickup device 10 as a file management apparatus according to the embodiment is described with reference to FIG. 1. FIG. 1 is a block diagram illustrating a general configuration of the image pickup device 10 as a file management apparatus according to the embodiment.

The image pickup device 10 includes a video camera such as a camcorder, and can record video and audio data (image material data) obtained by taking an image of an object of shooting in a removable storage medium such as an optical disk. The video and audio data is video data and/or audio data, which includes, for instance, moving picture data used for a TV program or a moving picture, still image data such as pictures and paintings, audio data recorded in the shooting environment, or a combination of the data described above.

As shown in FIG. 1, the image pickup device 10 has, for instance, a CPU 102, a memory section 104, an input section 106, a display section 108, an audio output section 110, a communication section 112, an external interface 114, a camera block 116, a disk device 118, a file system 140, an interface section 150, and an external application 180.

The CPU 102 is an arithmetic processing unit which operates according to a program stored, for instance, in the memory section 104, and controls operations of various sections in the image pickup device 10. The memory section 104 includes a semiconductor memory such as a RAM, a ROM, or a flash memory, and has a function to temporally store therein various data relating to processing by the CPU 102, a program for running the CPU 102, and the like.

The input section 106 includes operation tools including various types of buttons, switches, levers, dials, and a touch panel. A user can perform various adjustment for picking up an image such as power ON/OFF, adjustment of an aperture of a lens, and adjustment for zooming, and also can input, for instance, an instruction for recording or reproducing video and audio data, an instruction for access to a file storing video and audio data therein (such as reading, updating, and deleting), an instruction for newly denominating an arbitrary file name or changing the file name, and an instruction for switching between the arbitrary file name mode and the standard file name mode. The CPU 102 controls operations of various sections such as the camera block 116 in correspondence to contents of the user's operation of the input section 106.

The display section 108 is, for instance, a display device such as a liquid crystal display device (LCD). The display section 108 displays video and audio data generated during shooting, video and audio data reproduced from the storage medium 3, setup information for the image pickup device 10, and various types of meta data relating to video contents. Furthermore the display section 108 can display a list of file names of files for video and audio data stored in the storage medium 3 or the like. The processing for displaying the list of file names is described in detail below. The audio output section 110 includes a sounding device such as a speaker and an audio data processing unit, and outputs audio data or the like contained in the video and audio data.

The communication section 112 is a communication device for sending and receiving various types of data such as video and audio data, meta data for the same, and file names via a network, to and from an external device such as a personal computer. The external interface 114 is hardware for connecting the external device to the image pickup device 10 through a wire (such as USB (Universal Serial Bus)), a cable, or the SCSI (Small Computer System Interface) and sending and receiving the various types of data as described above.

The camera block 116 is hardware for generating video and audio data by picking up an image of an object for shooting. This camera block 116 includes, for instance, an image pickup section including image pickup elements such as a lens, a focusing mechanism, a filter, a CCD (Charge Coupled Device) and the like and outputting a video signal; a microphone section for generating collecting audio data from a site for shooting and generating audio signals, a video processor for processing the video signals and audio signals and generate video and audio data, and the like. The video and audio data generated by the camera block 116 is recorded as a video and audio file by the file system 140 described later in the storage medium 3.

The disk device 118 is a devise used for writing and reading various types of data files to and from the storage medium 3 such as an optical disk. The disk device 118 can write a video and audio file, a meta data file, a file name correspondence table and the like generated by the file system 140 in and reading the data from the storage medium 3.

The storage medium 3 is a detachable removable storage medium on the image pickup device 10 (loading/unloading), and includes an optical disk (such as a DVD, a CD, and a PD) in which data is written in or from which data is read by making use or a laser light beam. The storage medium 3 is not limited to the optical disk, and may include a magnetic disk such as a flexible disk or a hard disk, a magnetic optical disk such as an MO, a magnetic tape such as a video tape based on the digital VTR format, or a semiconductor memory such as a flash memory, an SRAM (Static Random Access Memory), an EEPROM (Electrically Erasable Programmable Read-Only Memory), and in this case the image pickup device 10 may have a reader/writer compatible with the various types of storage media in place of the disk device 118. The storage medium 3 is not limited to the removable disk as described above, and may be a storage medium incorporated in the image pickup device 10 (such as the memory section 104 or an incorporated HDD).

The file system 140 is software having a function to control files (such as video and audio files, meta data files and the like) of various types of data stored, for instance, in the storage medium 3. The file management includes but not limited to operations for generating, transferring, deleting, reading data from, overwriting or writing data in generation, transfer, a file or a directory (a folder), and those for assigning or updating a file name. The file system 140 can treat only a file with a standard file name following the file denomination rule.

The interface section 150 is software compatible with arbitrary file names present in the file system 140 and in the external applications 180, 182. This interface section 150 manages the file name correspondence table in which a correspondence between standard file names and arbitrary file names is described, and has the function to make the file system 140 capable of treating the standard file names treat also arbitrary file names. The file system 140 and the interface section 150 are indispensable components in this embodiment, and are described in detail hereinafter.

The external application 180 is software (such as an application having the browser function) which provides a prespecified service to a user. For instance, the external application 180 displays a list of file names of files stored in the storage medium 3 by making use of the file system 140, accesses a desired file stored in the storage medium 3 (for reading, overwriting, and deleting data), and write a file provided from the outside in the storage medium 3.

The file system 140, interface section 150, and external applications 180, 182 send and receive data in files stored in the storage medium 3, file names for the files, FTP commands and the like according to the FTP (File Transfer Protocol). Although the file system 140, the interface section 150, and the external application 180 can be realized as software by running a program stored in a storage device (memory section 104 or the like) of the image pickup device 10, but the functions may be configured with dedicated hardware having the functions described above.

<2. Configuration of File System>

Figure 2:
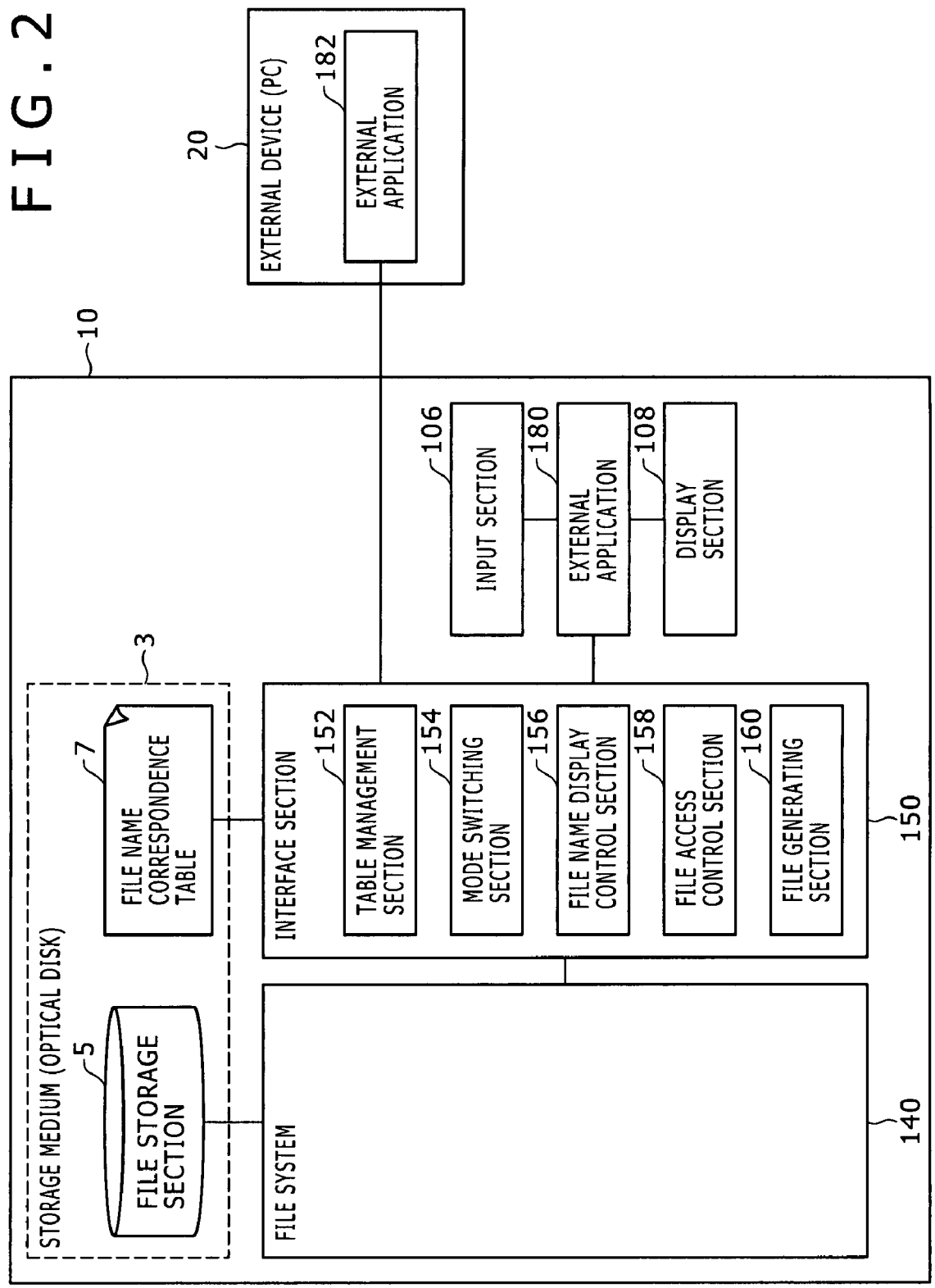
FIG. 2 is a block diagram illustrating configurations of a file system and various peripheral portions of the image pickup device according to the embodiment.

Next, a functional configuration of the file system 140 and other peripheral sections of the image pickup device 10 according to the present embodiment are described in details below with reference to FIG. 2. FIG. 2 is a block diagram illustrating the file system 140 and peripheral sections of the image pickup device 10 according to the present embodiment.

As shown in FIG. 2, provided in the detachable storage medium 3 of the image pickup device 10 is a file storage section 5 for storing therein such files as video and audio files generated by shooting and meta data files. A file stored in the file storage section 5 is controlled by the file system 140 and has a directory/file structure. Furthermore stored in the storage medium 3 having files recorded therein is the file name correspondence table 7 described hereinafter. In the example shown in FIG. 2, an external device 20 such as a personal computer is connected to the image pickup device 10, and the external device 20 has an external application 182 having the same functions as those of the external application 180 in the image pickup device 10.

The file system 140 has a function to manages files of various types of data stored in the file storage section 5 in the storage medium 3 (such as generating, transferring, deleting, reading data from, overwriting data in, writing data in the files, assigning file names to the files, and updating contents of the files).

For instance, the file system 140 functions as a video and audio file generating section, generates a file of the video and audio data obtained by image pickup processing with the camera block 116 of the image pickup device 10 and records the file in the storage medium 3. The file system 140 record the video and audio data as an MXF (Material exchange Format) file based on the SMPTE (Society of Motion Picture and Television Engineers) standard in the storage medium 3. This video and audio file is generated each time one continuous shooting operation is performed, and for instance, when shooting is performed three times, three video and audio files are generated.

The file system 140 also functions as a meta data generating section, and for instance, generates a meta data file described with the XML (eXtensible Markup Language) or the like as meta data relating to the video and audio file simultaneously when the video and audio file above is generated, and stores the meta data file in the storage medium 3. The meta data is, for instance, a title of the video and audio data or annotation for the text (scenario data for a video work, shooting conditions at the site of shooting, information concerning setup of equipment used for shooting, and the like), thumb nail data for representative still images in the video and audio data, and electronic mark data relating to features of the video and audio data, and the meta data file is generated in response to user's input from the input section 106.

When the file as described above is to be generated, the file system 140 automatically assigns standard file names following the existing denomination rule such as "CxxxxMXF" (wherein XXXX is 0001 to 9999) to the video and audio files, and furthermore automatically generates metadata data files having standard file names following the existing denomination rule such as "CxxxxM01.XML" (wherein xxxx is 0001 to 9999). By automatically assigning standard file names following the existing denomination rule, thereby, use of the same file name is prevented, and a work load for inputting file names can be omitted.

On the other hand, in a case where a video and audio file generated outside is recorded in the file storage section 5, the denomination rule for the file system 140 is also applied in this case. Namely, the file system 140 accepts, only when a file name of a video and audio file follows the denomination rule, the file is recorded in the file storage section 5.

As described above, in the file system 140, file names assignable to a video and audio file or a meta data file are limited to standard file names following the existing denomination rule lacking a freedom such as "Cxxxx.MXF" or "CxxxxM01.XML". The file system 140 accept only the standard file names following the denomination rule, and does not accept an arbitrary file name freely assigned by a user.

For instance, when the file system 140 receives a file name list display request (for instance, FTP LIST command) from the external applications 180, 182, the file system 140 reads out and output standard file names assigned to files stores in the file storage section 5, but does not output an arbitrary file name. When the file system 140 receives a request for access to a file stored in the file storage section 5 from the external applications 180, 182 (such as FTP GET command or the like), the file system 140 accepts specification of a file with a standard file name, but does not accept specification of a file with an arbitrary file name.

To overcome the problems as described above, in this embodiment, to enable the file system 140 capable of treating only standard file names following the existing file denomination rule as described above to also cope with arbitrary file names, the interface section 150 capable of coping with an arbitrary file name is provided between the file system 140 and the external applications 180, 182, and the file name correspondence table 7 is managed by the interface section 150.

Described in this file name correspondence table 7 is a correspondence among standard file names assigned, when video and audio files are generated, to the video and audio file following the existing denomination rule (such as "C0001" or the like), arbitrary file names separately assigned to the files respectively (such as "Fuji" and the like), and unique file identifiers specifically assigned to the files respectively when the files are generated (such as "060A2B34 . . . 1" or the like). The files, correspondence of which is described in the file name correspondence table 7, are each having an arbitrary file name assigned thereof among the video and audio files stored in the storage medium 3.

In the arbitrary file name mode, the interface section 150 converts standard file names acquired from the file system 140 to arbitrary file names based on the file name correspondence table 7, makes the external applications 180, 182 display the list, converts arbitrary file names specified from the external applications 180, 182 to the corresponding standard file names or file identifiers, and sends an access request to the file system 140. With the operations enabled to access to a desired file in the storage medium 3 by using the arbitrary file name.

Now a configuration of the interface section 150 is described in detail below. As shown in FIG. 2, the interface section 150 has a table management section 152, a mode switching section 154, a file name display control section 156, a file access control section 158, and a file generating section 160.

The table management section 152 generates and manages the file name correspondence table 7. More specifically, when assignment of a new arbitrary file name to a file having a standard file name already assigned thereto is requested from the external applications 180, 182, the table management section 152 correlates the standard file name and the file identifier of the file to the new arbitrary file name, and registers the new arbitrary file name in the file name correspondence table 7. Denomination of an arbitrary file name is performed, for instance, by a user, and the user freely inputs a desired arbitrary file name with the input section 106 under the assistance by the external applications 180, 182. When change of the arbitrary file name assigned to a file is requested from the external applications 180, 182, the table management section 152 updates an item for an arbitrary file name of the file in the file name correspondence table 7 to a new arbitrary file name.

When deletion of an arbitrary file name already assigned to a file is requested from the applications 180, 182, or when it is detected that a file having the standard file name described in the file name correspondence table 7 or a file having a file identifier described in the file name correspondence table 7 is not present in the storage medium 3 (namely when the file has not been stored), the table management section 152 deletes all items of the file in the file name correspondence table 7. In an example of the processing for detection, the table management section 152 compares a file identifier described in the file name correspondence table 7 to a file identifier assigned to a file stored in the storage medium 3. When the file identifiers are not identical to each other, the table management section 152 determines that the file is not present in the storage medium 3. The description above assumes a case in which determination is made by checking file identifiers, but both a file identifier and a standard file name may be used as data for determination. In this case, consistency between files actually stored in the storage medium 3 and files having arbitrary file names described in the file name correspondence table 7 can be checked. This consistency check is formed by reading the file name correspondence table 7 from the storage medium 3, for instance, when the storage medium 3 is loaded in the image pickup device 10.

The table management section 152 can check consistency between data described in the file name correspondence table 7 and data stored in the storage medium 3, for instance, when the storage medium 3 is loaded, or when the arbitrary file name mode is effected. When the file name correspondence table 7 is newly generated, the table management section 152 assigns a storage medium identifier (for instance, an optical disk ID assigned to each optical disk) for the storage medium 3 in which the file name correspondence table 7 is to be stored to the file name correspondence table 7. When the new storage medium 3 is loaded in the image pickup device 10, the table management section 152 reads out the file name correspondence table 7, and compares the storage identifier assigned to the file name correspondence table 7 with the storage medium identifier of the storage medium 3 itself actually stored in the storage medium 3. When the two storage identifiers are identical to each other, it is determined that the file name correspondence table 7 stored in the storage medium 3 is correct and consistent, the table management section 152 permits treatment of the file name correspondence table 7. On the other hand, when the two storage medium identifiers are not identical to each other, the table management section 152 inhibits treatment of the file name correspondence table 7. With this operation, it is possible to prevent management of the file based on the file name correspondence table 7 not consistent to files stored in the storage medium 3.

The mode switching section 154 performs switching between the arbitrary file name mode allowing for use of an arbitrary file name and the standard file name mode not allowing for use of an arbitrary file name according to an input from a user. To set the operating mode in the arbitrary file name mode, the mode switching section 154 turns ON functions of various sections (a file name display control section 156, a file access control section 158, a file generating section 160 and the like) of the interface section 150. Because of the feature, in the arbitrary file name mode, the interface section 150 functions between the file system 140 and the external applications 180, 182, and a standard file name can be converted to an arbitrary file name based on the file name correspondence table 7, display of a list of arbitrary file names, or file access with an arbitrary file name can be performed.

On the other hand, when the operating mode is set in the standard file name mode, functions of the various sections of the interface section 150 are turned OFF. With this operation, the interface section 150 is disabled, and information is not directly transacted between the file system 140 and the external applications 180, 182, and therefore such operations as display of a list of arbitrary file names and file access with an arbitrary file name can not be performed.

The mode switching section 154 performs the operating mode for coping with file names as described above in response to a user's input for selection of the operating mode. By configuring an equipment menu of the image pickup device 10 so that switching can be performed between the standard file name mode and the arbitrary file name mode described above, the two operating modes are implemented in one image pickup device 10. Therefore the image pickup device 10 can satisfy the needs of users who want to use the standard file name mode in the past and also the needs of users who want to use the arbitrary file name mode having a higher degree of freedom.

In the arbitrary file name mode, when the external applications 180, 182 try to display a list of various types of files stored in the storage medium 3, if the arbitrary file names have been assigned to the files, the file name display control section 156 has the arbitrary file names displayed, and the standard file names originally assigned to the files are displayed in the file system 140.

When a list of standard file names for files stored in the storage medium 3 is received from the file system 140 in response to a file name list display request (such as, for instance, FTP LIST command) from the external applications 180, 182, the file name display control section 156 determines whether arbitrary file names have been assigned to the files or not based on the file name correspondence table 7. When it is determined that arbitrary file names have been assigned, the file name display control section 156 converts the standard file names acquired from the file system 140 to the arbitrary file names based on the file name correspondence table 7, outputs the arbitrary file names to the external applications 180, 182 so that the arbitrary file names are displayed as a list in the display section 108 (Refer to FIG. 6). When it is determined that the arbitrary file names have not been assigned, the standard file names acquired from the file system 140 are output to the external applications 180, 182, so that the standard file names are displayed as they are. With the functions of the file name display control section 156 as described above, even when the file system 140 capable of treating only standard file names is used, the file name list display function is extended and display of arbitrary file names is enabled.

When a file name list display request is received in the arbitrary file name mode, the file name display control section 156 notifies not only file names of video and audio files and meta data files stored in the file storage section 5, but also the file name "AliasList.XML" for the file name correspondence table 7 stored in the storage medium 3 to the external applications 180, 182. On the other hand, in the standard file name mode, even if the file name correspondence table 7 is stored in the storage medium 3, file names in the file name correspondence table 7 are not notified to the external applications 180, 182. Because of the feature as described above, the external application 180, 182 can determine whether the file name correspondence table 7 is present or not by checking whether notification of file names in the file name correspondence table 7 has been received or not from the interface section 150, and also can determine which of the arbitrary file name mode and the standard file name mode has been effected in the image pickup device 10 by checking whether the file name correspondence table 7 is present or not.

In the arbitrary file name mode, when access to a video and audio file as an object for access is requested with an arbitrary file name assigned to the file (for reading, overwriting, or deleting data) from the external applications 180, 182, converts the arbitrary file name to a corresponding standard file name based on the file name correspondence table 7, and gives an instruction for access to the file with the standard file name after conversion to the file system 140. On the other hand, when an access request is specified with a standard file name, the file access control section 158 gives an instruction to the file system 140 for access to the access target file using the standard file name as it is. Because of the feature of the file access control section 158 as described above, even when the file system 140 capable of treating only standard file names, the external application 180, 181 can access a file in the storage medium 3 via an arbitrary file name.

In the arbitrary file name mode, when generation of a new video and audio file having an arbitrary file name not following the denomination rule for standard file names (ETP PUT command) is requested from the external applications 180, 182, the file generating section 160 generates a video and audio file having a standard file name following the denomination rule, and also registers a correspondence between the standard file name and the arbitrary file name. Because of the feature, when a video and audio file stored in the external device 20 or the like is copied or transferred and newly written in the storage medium 3 of the image pickup device 10 with the external applications 180, 182, the file can be made compatible to the file system 140 described above.

Various sections of the interface section 150 according to this embodiment are described above. By providing the interface section 150 and the file name correspondence table 7 as interfaces to the external applications 180, 182, the file system 140 capable of treating only standard file names following the existing denomination rule is made compatible to arbitrary file names.

The final name correspondence table 7 is stored, as shown in FIG. 2, in the storage medium 3 in which files such as video and audio files and meta data files are stored, and furthermore because the storage medium 3 is configured with a removable storage medium such as an optical disk, so that the storage medium 3 can freely be load in or unloaded from a plurality of equipment. Therefore, the user can treat a video and audio file storing therein and data recorded with the image pickup device 10 and the file name correspondence table 7 for the file as one set, and the feature enables efficient and convenient file management when a file is shared in a plurality of image pickup devices 10 or in a plurality of external devices 20.

<3. Example of Description in a File Name Correspondence Table>

Next, an example of description in the file name correspondence table 7 according to the present embodiment is described below. FIG. 4 is a view illustrating an example of description in the file name correspondence table 7 according to the embodiment of the present invention, and the description corresponds to contents described in the file name correspondence table 7 shown in FIG. 3.

As shown in FIG. 4, in the file name correspondence table 7, correspondence among a standard file name, arbitrary file name, and a file identifier of a video and audio file is expressed, for instance, by the XML statement data described with XML (file name: "AliasList.XML"). In this file name correspondence table 7, the proavIdRef attribute and each Alias element are described as the AliasList route elements.

The proavIdRef attribute represents an identifier for the storage medium 3 in which the file name correspondence table 7 (AliasList.XML). When the storage medium 3 is manufactured, assigned to the storage medium 3 is a storage device identifier (such as a disk ID specifically assigned to each optical disk) uniquely identifying the storage medium 3, and the storage medium identifier is securely stored in the storage medium 3. When the file name correspondence table 7 is generated, the table management section 152 in the image pickup device 10 reads the storage medium identifier (disk ID) assigned to the storage medium 3 from the storage medium 3 in which the file name correspondence table 7 is recorded, and assigns the storage medium identifier as the proavIdRef attribute to the file name correspondence table 7 to correlate the file name correspondence table 7 to the storage medium 3.

A change such as overwriting in the file name correspondence table 7 by the external applications 180, 182 is permitted as described below in this embodiment, at this time, whether data is overwritten on a desired file listed in the file name correspondence table 7 or not can be confirmed by verifying the proavIdRef attribute described in the file name correspondence table 7 to the storage medium identifier assigned to the storage medium 3. It is to be noted that the storage medium identifier is not limited to the disk ID, and any ID may be used in response to a type of the storage medium 3 so long as the ID enables identification of the storage medium 3 in which the file name correspondence table 7 is stored.

Each Alias element is allocated to each video and audio file, and describes a correspondence among a standard file name (original attribute value: "C0001" or the like), an arbitrary file name (value attribute value: "Fuji" or the like), and a file identifier (target attribute value: "060A2B34 . . . 1" or the like").

Of these, the file identifier which is a target attribute value is an identifier uniquely identifying the video and audio file, and is uniquely assigned to the file when the video and audio file is generated, or when contents of the file is overwritten and changed. More specifically, for instance, 32-byte length data based on the UMID (Unique Material IDentifier) standard defined as SMPTE 330M can be used as a file identifier, but the file identifier is not limited to the example described above, and for instance, an identifier based on UUID (Universally Unique IDentifier) standard may be used for the purpose. By describing a file identifier for each video and audio file in the file name correspondence table 7, it is possible to check whether a video and audio file actually corresponding to an arbitrary file name described in the file name correspondence table 7 or not by verifying the file identifiers in the file name correspondence table 7 stored in the storage medium 3 to file identifiers for video and audio files in the storage medium 3.

An example of description in the file name correspondence table 7 according to the embodiment is described above. In the file name correspondence table 7, a file name for a video and audio file not including an extension (only the "Cxxxx" portion of the standard file name following the existing denomination rule, or an arbitrary file name "Fuji") is described in the file name correspondence table 7, and the meta data file name is not described because the meta data file name is based on the video and audio file. The XML is employed as a language for description in the file name correspondence table 7 because XML is highly versatile and the grammar is relatively simple and easy to learn, but the language for description in the file name correspondence table 7 is not limited to XML, and any syntax including other markup languages such as SGML (Standard Generalized Markup Language), simple CSV (Comma Separated values) and the like may be used.

<4. Processing for Displaying File Name List>

Figure 5:
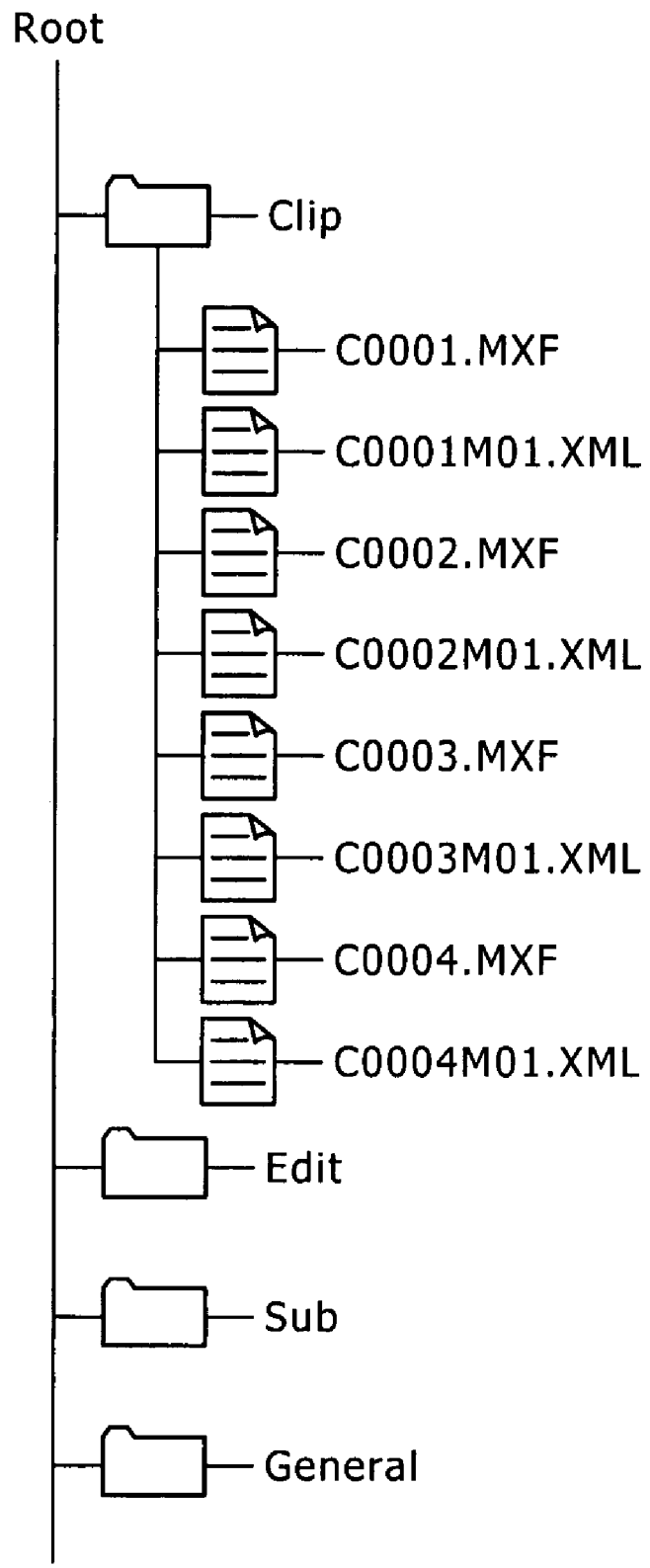
FIG. 5 is an explanatory view illustrating an example of file name list display in the standard file name mode according to the embodiment.
Figure 6:
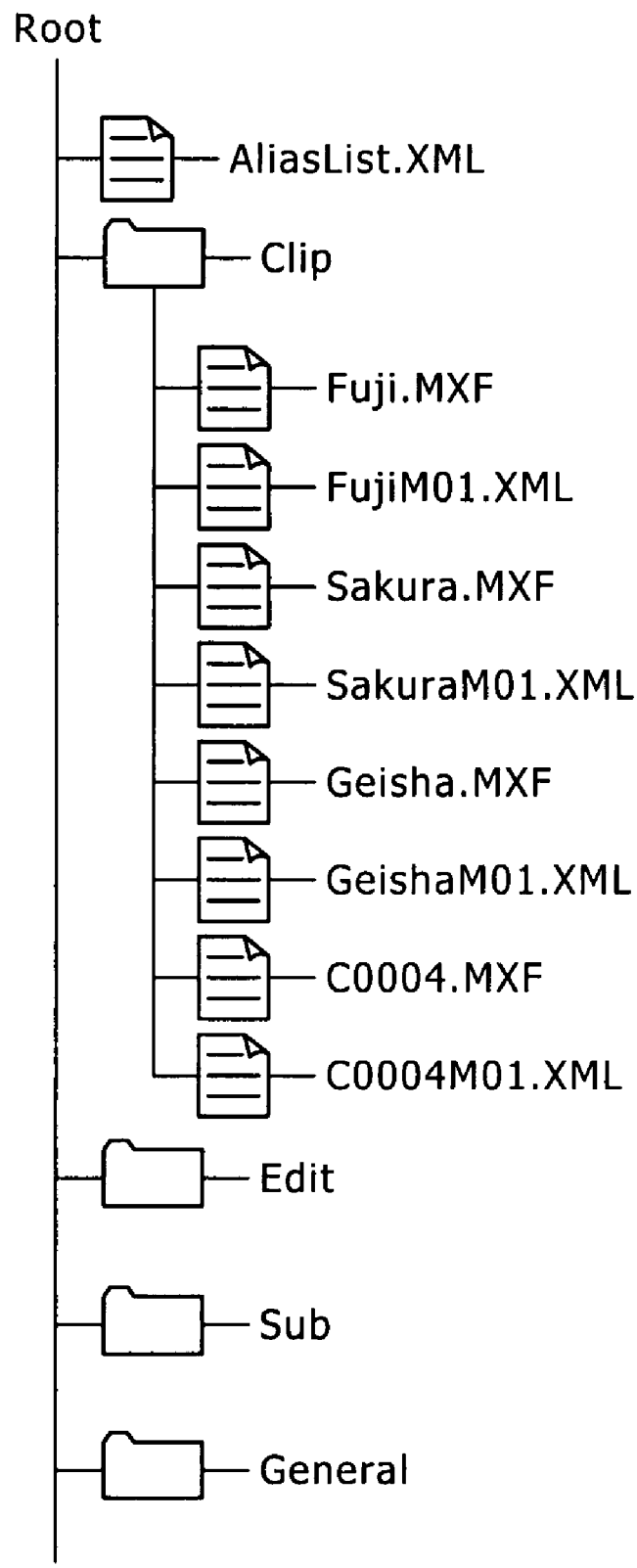
FIG. 6 is an explanatory view illustrating an example of file name list display in the arbitrary file name mode according to the embodiment.

Next, an example of an interface for a file name list display in the image pickup device 10 according to this embodiment is described below with reference to FIG. 5 and FIG. 6. FIG. 5 and FIG. 6 are views illustrating an example of a file name list display in the standard file name mode and an example of file name list display in the arbitrary file name mode.

As described above, the image pickup device 10 according to this embodiment can cope with both the standard file name mode and the arbitrary file name mode by using the interface section 150 and the file name correspondence table 7.

In the standard file name mode, when the external applications 180, 182 try to access a video and audio file and/or a meta data file stored in the storage medium 3, the file system 140 delivers a file name list having the directory/file structure as shown in FIG. 5, for instance, with the FTP to the external applications 180, 182 to have the file name list displayed on the display section 108.

The example shown in FIG. 5 is a file name list having a directory/file structure shown when the external applications 180, 182 access the storage medium 3 in which 4 video and audio files having the standard file names of "C0001.MXF", "C0002.MXF", "C0003.MXF", and "C0004.MXF". The "CxxxxM01.XML" is a meta data file (XML. document) which exists in the state where the file is correlated to the video and audio files "Cxxxx.MXF", and is automatically generated or deleted together with the "Cxxxx.MXF". Namely the meta data file "CxxxxM01.XML" itself is completely dependent on the video and audio file "Cxxxx.MXF", and a file name dependent of the video and audio file name (Cxxxx) is assigned to the meta data file.

Furthermore, as shown in FIG. 5, as an interface for file name list display, in addition to the "Clip/directory" including video and audio files and meta data files described above, there are, for instance, the "Edit/directory" in which play list data is stored, the "Sub/directory" in which video and audio data in each video and audio file with a low resolution is stored, the "General/directory" in which other general files are stored, and the like, but detailed description of the interfaces is omitted herefrom for the sake of simplicity. It is to be noted that also the play list file in the "Edit/directory" is made compatible with arbitrary file names like the video and audio files according to this embodiment, but the description is omitted.

As shown in FIG. 5, in the standard file name mode, for the video and audio data files and meta data files stored in the storage medium 3, standard file names output from the file system 140 are shown as they are. A user can decide a file of which the user wants to access (a video and audio file to be reproduced or the like) by checking the standard file name list display.

An interface for file name list display in the arbitrary file name mode is described below. In the arbitrary file name mode, a standard file name assigned to a file is converted to an arbitrary file name based on the file name correspondence table 7 shown in FIG. 4, and the arbitrary file name generated by converting the standard name is displayed in place of the standard file name. As a result, for instance, the directory/file structure in the standard file name mode shown in FIG. 5 is displayed with a file name list in the arbitrary file name mode as shown in FIG. 6. In FIG. 6, the three video and audio files originally having the standard file names of "C0001.MXF", "C0002.MXF", and "C0003.MXF" respectively are displayed with the arbitrary file names of "Fiji.MXF", "Sakura.MXF", and "Geisha.MXF" respectively. For a meta data file correlated to a video and audio file, like in the standard file name mode, an arbitrary file name is denominated according to an arbitrary file name of the video and audio file. Therefore, for instance, a meta data file correlated to the video and audio file having the arbitrary file name of "Fuji.MXF" is displayed with the arbitrary file name of "FujiM01.XML".

On the other hand, when an arbitrary file name is not assigned to a video and audio file, the standard file name originally assigned to the file is displayed as it is. In the example shown in FIG. 6, since an arbitrary file name is not assigned to the video and audio file having the standard file name of "C0004.MXF" originally assigned thereto, the file name correspondence table 7 includes no description of the Alias element for the file, and therefore, also in the arbitrary file name mode, the standard file name of "C0004.MXF" originally assigned thereto is displayed as it is. Also the meta data file corresponding to the video and audio file is display with the standard file name of "C0004M01.XML".

The example shown in FIG. 3 assumes a case in which arbitrary file names are assigned to three among four video and audio files stored in the storage medium 3, but the embodiment of the present invention is not limited to the configuration in this case. For instance, when arbitrary file names are assigned to all of video and audio files stored in the storage medium 3, the files are displayed with the arbitrary file names, and even when the image pickup device 10 is running in the arbitrary file name mode, all of the files are displayed with the standard file names.

When displaying a file name list in the arbitrary file name mode, as shown in FIG. 6, not only the video and audio file and the meta data file, but also the file name of "AliasList.XML" in the file name correspondence table 7 stored in the storage medium 3 is displayed. In contrast, in the standard file name mode, even if the file name correspondence table 7 has been storied in the storage medium 3, since the interface section 150 does not notify presence of the file name correspondence table 7 to the external applications 180, 182, the file name "AliasList.XML" for the file name correspondence table 7 is not displayed in the file name list (Refer to FIG. 5). AS described above, in the standard file name mode, the file name correspondence table 7 is not deleted from the storage medium 3, and the interface section 150 does not notify presence of the file name correspondence table 7 to the external applications 180, 182. This functional configuration is employed because, if the file name correspondence table 7 is deleted in the standard file name mode, the file name correspondence table 7 can not be utilized when the standard file name mode is again switched back to the arbitrary file name mode.

AS described above, by providing controls so that the file name "AliasList.XML" for the file name correspondence table 7 is displayed only in the arbitrary file name mode, the interface section 150 can determine whether the image pickup device 10 is running in the arbitrary file name mode or in the standard file name mode based whether a file name for the file name correspondence table 7 is received from the external applications 180, 182 or not. Because of the feature, the external applications 180, 182 can provide services corresponding to the operating mode (For instance, an arbitrary file name can be assigned or changed by a user only in the arbitrary file name mode).

Figure 7:
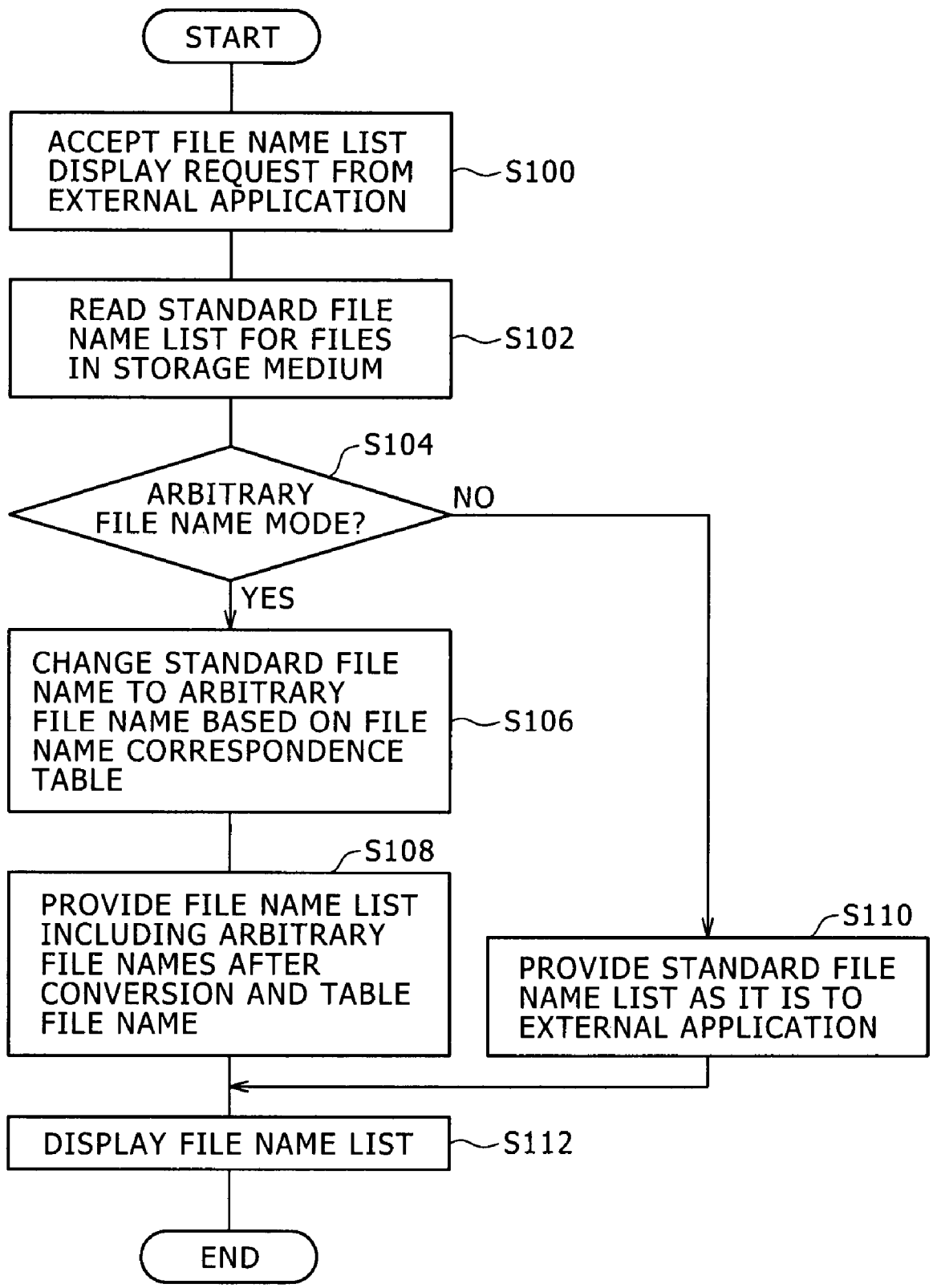
FIG. 7 is a flow chart illustrating a flow of file name list display processing in a file management method according to the embodiment.

Next, a flow of processing for displaying a file name list in the file management method according to the embodiment of the present invention is described. FIG. 7 is a flow chart illustrating a flow of processing for displaying a file name list in the file management method according to the present embodiment.

As shown in FIG. 7, at first, in step S100, the file system 140 accepts a file name list display request (for instance, FTP LIST command) from the external applications 180, 182. To describe more specifically, the external applications 180, 182 transmit a file name list display request to the interface section 150 in response to a user's input for checking contents of files in the storage medium 3. The interface section 150 outputs the file name list display request as it is to the file system 140, and the file system 140 accepts this file name list display request.

In step S102, when the file system 140 accepts the file name list display request, the file system 140 reads out all of standard file names for various types of files such as video and audio files and meta data files stored in the storage medium 3, and outputs a standard file name list having the directory/file structure as shown in FIG. 5, for instance, with the FTP, to the interface section 150.

The interface section 150 determines which of the arbitrary file name mode and the standard file name mode has been effected (Step 104), and processing flows to step 106 when the arbitrary file name mode has been effected, or flows to step 110 when the standard file name mode has been effected.

In step S106, the interface section 150 converts, based on the file name correspondence table 7, a part or all of standard file names in the standard file name list that has been received from the above file system 140 to arbitrary file names. Particularly, the file name display control section 156 of the interface section 150 refers to the file name correspondence table 7 stored in the storage medium 3 and detects standard file names, in which correspondent relationships with arbitrary file names are described in the file name correspondence table 7, of the standard file name list received from the file system 140, to convert the standard file names to the arbitrary file names respectively. The standard file names in which the correspondent relationships with arbitrary file names are not described in the file name correspondence table 7 are not converted.

Further, in step 108, the interface section 150 adds file names in the file name correspondence table 7 to a file name list including the converted arbitrary file names and the unconverted standard file list to provide to the external applications 180, 182 of the requesters. As a result, the external applications 180, 182 obtains the file name list including the arbitrary file name from the interface section 150 and displays the file name list of the directory/file structure as shown in FIG. 6 (Step S112).

On the other hand, when it is determined that the standard file name mode has been effected in the step S104, the interface section 150 provides the standard file name list received from the file system 140 unconverted to the external applications 180, 182 of the requesters in step S110. Consequently, the external applications 180, 182 obtain the standard file name list from the interface section 150 to display the file name list of the directory/file structure shown in FIG. 5 (Step S112).

As described above, the file name list display process according to the present embodiment can convert, when the arbitrary file name mode has been effective, the standard file names stored in the storage medium 3 to the arbitrary file names based on the file name correspondence table 7 to display the file names. With the display process, a user can read the file list in the storage medium 3 with the arbitrary file name freely assigned by a user, and then can understand data contents and file-generated date of each file with the arbitrary file name (for example, if the arbitrary file name is "Fuji20060101.MXF", it is determined that the file is the video and audio file in which Mt. Fiji was imaged on Jan. 1, 2006). Or, when the standard file name mode has been effective, the standard file name unconverted of the file stored in the storage medium 3 is displayed and accordingly, the file name list display process can also correspond to a user who desires to read the file name list with the standard file name in the past way.

<5. Processing for Accessing a File>

Description is provided for an access process to files stored in the storage medium 3. In the arbitrary file name mode, it enables not only display of the list of file names above but also specification of files when accessing, such as reading, overwriting, and deleting of files stored in the storage medium 3 with the arbitrary file names. In this case, in the image pickup device, the standard file name corresponding to the arbitrary file name that is specified by the external applications 180, 182 is detected, based on the file name correspondence table 7, by internal management of the interface section 150 to the file name correspondence table 7, and then the actual video and audio file is accessed by the file system 140 using the standard file name. When the arbitrary file name is not assigned to the video and audio file, the arbitrary file name correspondence is not described in the file name correspondence table 7 and then the standard file name unconverted is used for accessing to files.

Figure 8:
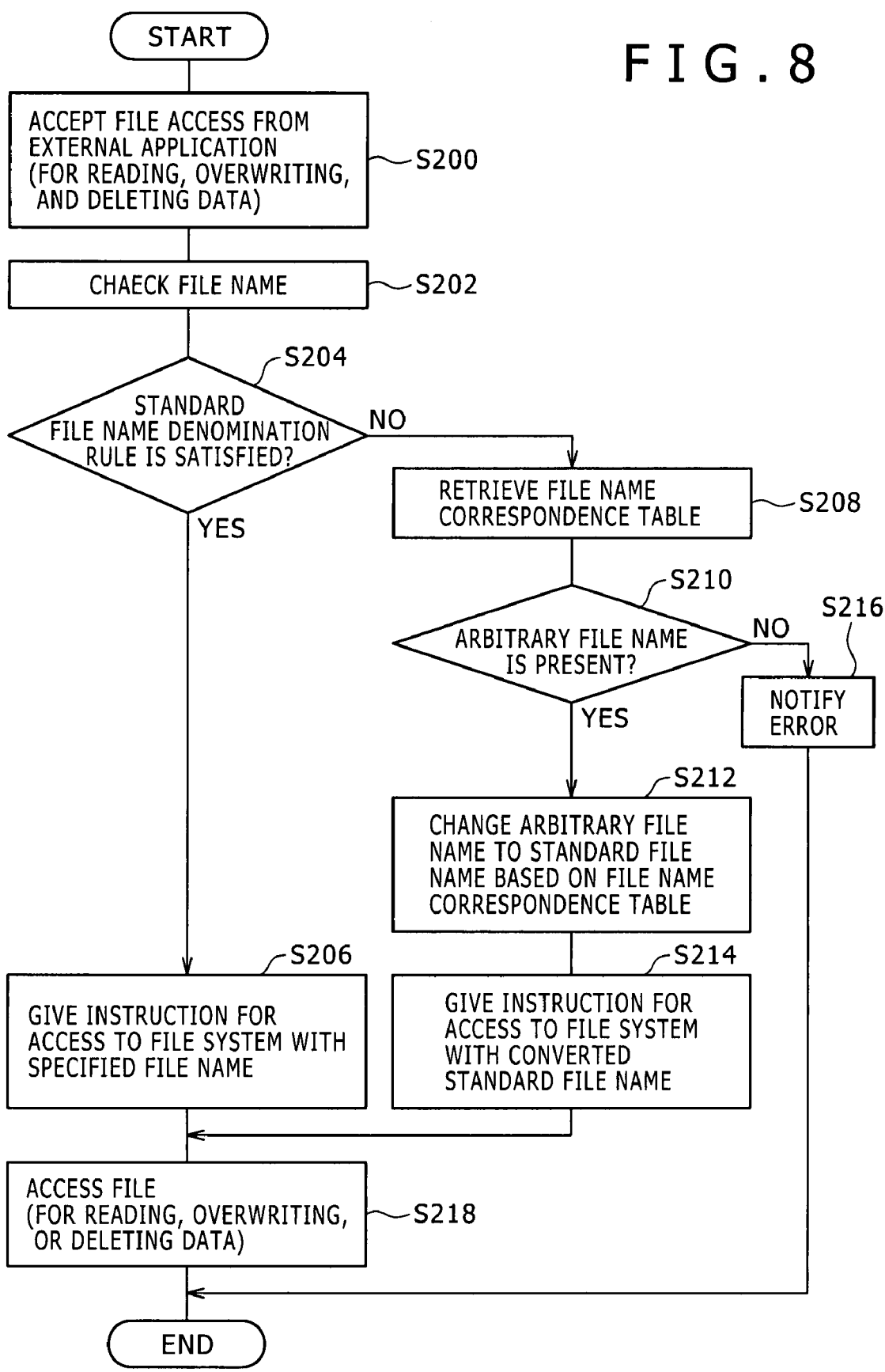
FIG. 8 is a flow chart illustrating a flow of file access processing in the file management method according to the embodiment.

Referring to FIG. 8, the description is provided for a process flow of a file access process in the file management method according to the present embodiment. FIG. 8 is a flowchart illustrating the file access process flow according to the present embodiment. It is assumed that the image pickup device 10 is specified to the arbitrary file name mode in the flowchart of FIG. 8.

As shown in FIG. 8, in step S200, the interface section 150 receives a file access request (for instance, FTP GET command).

Particularly, a user who has read the file name list shown in. FIGS. 5, 6 operates the input section 106 to specify files to be accessed and desired access contents (reading, overwriting, and deleting of files). The external applications 180, 182 send, in response to related user inputs, a file access request specifying the file name of the file to be accessed and the desired access contents to the interface section 150, which receives the file access request. Then, the file to be accessed is specified to which of the arbitrary name or the standard name.

In step S202, the file access control section 158 of the interface section 150 recognizes a file name of the file to be accessed specified by the external applications 180, 182 and, in step S204, it is determined whether the specified file name is matched to the existing denomination rule in the file system 140 or not (for instance, whether the file name is matched to the denomination rule of the standard file name or not).

As a result of the determination, when the file name is matched to the denomination rule, the specified file name is the standard file name. Accordingly, processing flows to step S206. In step S206, the interface section 150 outputs the file access request including the specified standard file name directly to the file system 140 to instruct so as to access to a file of the specified standard file name. As a result, the file system 140 performs a requested access (reading, overwriting, and deleting) to the file of the specified standard file name in the storage medium 3 (Step S218).

On the other hand, as a result of determination of the step S204, when the file name is not matched to the denomination rule, the specified file name is the arbitrary file name. Accordingly, processing flows to step S208. In step S208, the file access control section 158 of the interface section 150 searches the file name correspondence table 7 to seek description (Alias element) of correspondence relationships related to the specified arbitrary file name. In step S210, it is determined whether the description of the specified arbitrary file name is present or not in the file name correspondence table 7.

As a result of the determination, when the description of the specified arbitrary file name is present in the file name correspondence table 7, processing flows to step S212. The file access control section 158 converts the specified arbitrary file name to the standard file name based on the description (Step S212) to output a file access request including the converted standard file name to the file system 140 and then instruct so as to a file of the converted standard file name (Step S214). As a result, the file system 140 performs a requested access (reading, overwriting, and deleting) to a file of the converted standard file name in the storage medium 3 (Step S218).

As a result of the determination in the step S210, when the specified description of the arbitrary file name in not present in the file name correspondence table 7, a file to be accessed is specified by the arbitrary file name that cannot be converted to the standard file name. Accordingly, processing flows to step S216. In the step S216, the file access control section 158 notifies an error that access to the file of the specified arbitrary file name is not allowed to the external applications 180, 182 of the requester and then terminate all processes without file-accessing.

In the file access process above, even if specification of an arbitrary file name to be accessed is performed by an arbitrary file name in the arbitrary file name mode, the interface section 150 can convert the arbitrary file name to the standard file name corresponding to the arbitrary file name to instruct access to the file system 140. Thus, it is possible to perform, via an arbitrary file name, file access to the file system 140 capable of handling only the standard file name. In the standard file name mode, directly using the standard file name specified by the external applications 180, 182, access to a file of the standard file name is executed by the file system 140.

<6. Processing for Changing a File Name>

Next, processing for renaming (changing a file name of) a video and audio file in the arbitrary file name mode. The file system 140 or table management section 152 in the interface section 150 can rename a video and audio file in the storage medium 3. This operating for renaming a file can be classified to the following 4 cases according to a type of file names before and after the change.

(1) From a Standard File Name to a Standard File Name

The operation performed in this case is substantially the same as that in changing a file name in the standard file name mode. Namely, an existing standard file name assigned to a file stored in the storage medium 3 is changed to a new standard file name by the file system 140. In this step, the interface section 150 is not involved in this operation for renaming the file.

(2) From a Standard File Name to an Arbitrary File Name

In this case, when the table management section 152 in the interface section 150 receives a request for assigning an arbitrary file name to a file having only a standard file name assigned thereto, the table management section 152 adds an Alias element having the standard file name as an original attribute value or the arbitrary file name as a value attribute value to the file name correspondence table 7.

(3) From an Arbitrary File Name to a Standard File Name

In this case, as for a file with an arbitrary file name already assigned thereto, when a request for deleting the arbitrary file name and changing the file name to the standard file name originally having been assigned to the file is received, the table management section 152 in the interface section 150 deletes an Alias element having the arbitrary file name as a value attribute value from the file name correspondence table 7. When the specified standard file name different from the standard file name originally assigned to the file, the operation (1) described above is performed after the Alias element is deleted.

(4) From an Arbitrary File Name to an Arbitrary File Name

In this case, in relation to a file having an arbitrary file name already assigned thereto, when a request for changing the arbitrary file name to a new arbitrary file name is received, the table management section 152 in the interface section 150 changes the value attribute value in the Alias element for the file from the original arbitrary file name to a new arbitrary file name.

<7. Processing for Generating a New File>

Next, processing for generating a new file is described. For instance, as a method of newly generating a video and audio file, there is, for instance, the method in which a video and audio file having a standard file name following the existing denomination rule and an arbitrary file name not following the denomination rule are automatically generated, and then an Alias element representing a correspondence between the standard file name and the arbitrary file name is additionally described in the file name correspondence table 7.

Furthermore, there is also the method in which, when a request is received for copying or transferring a video and audio file having only an arbitrary file name stored in the external device 20 or the like to write contents in the file in the storage medium 3 in the image pickup device 10 (such as the FTP PUT command), a video and audio file having a standard file name automatically generated according to the exiting denomination rule is newly generated, and the operation for renaming "a standard file name to a new arbitrary file name" described above is performed for the video and audio file by the table management section 152 in the interface section 150.

Figure 9:
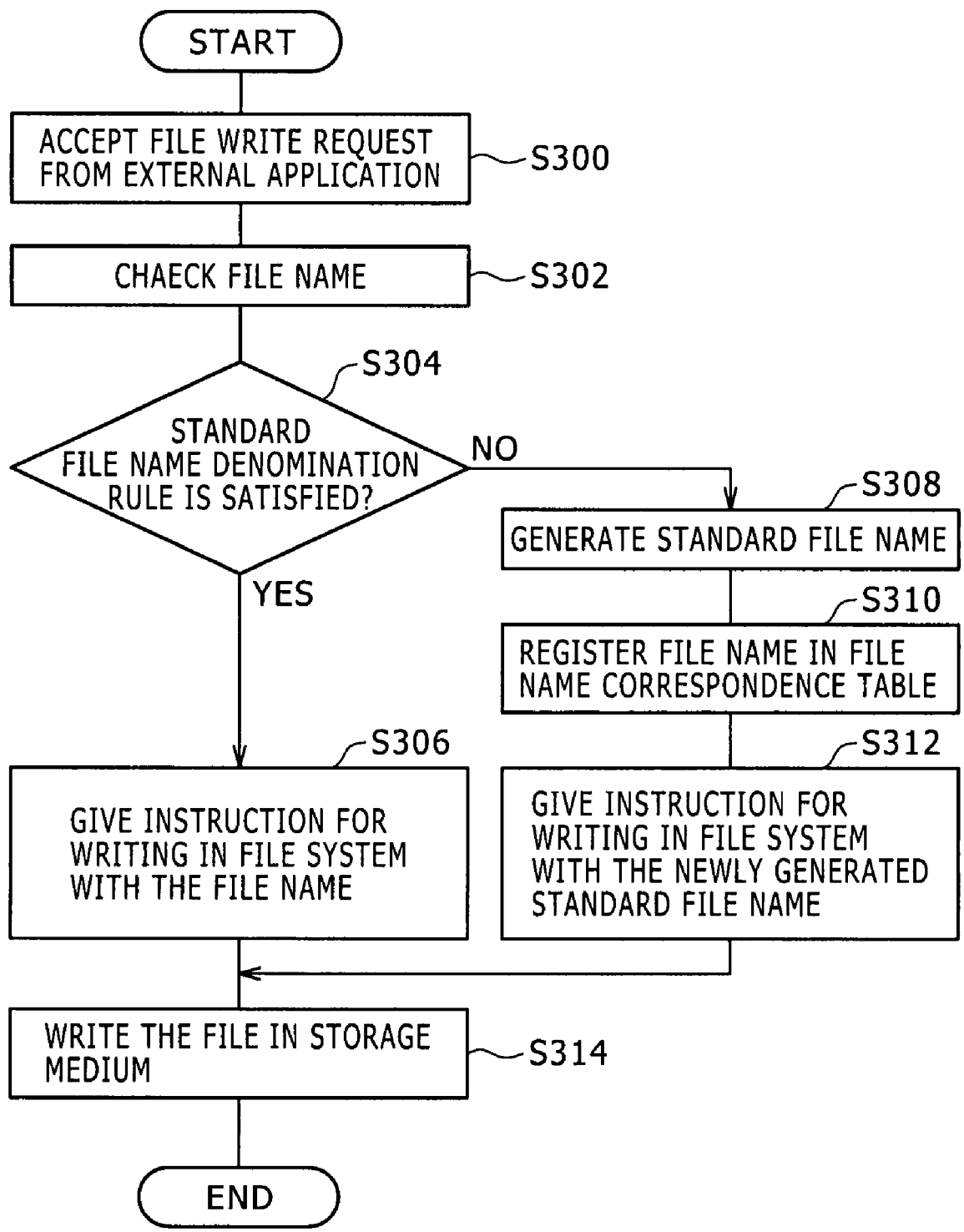
FIG. 9 is a flow chart illustrating a flow of processing for writing data in an external file in the file management method according to the present embodiment.

Herein, description is made for a flow of processing for newly writing an existing external file stored in an external storage medium in the storage medium 3 in the image pickup device 10 according to the file management method with reference to FIG. 9. FIG. 9 is a flow chart illustrating a flow for the processing for newly writing the external file in the file management method according to the embodiment of the present invention. It is to be noted that the flow shown in FIG. 9 assumes that the image pickup device 10 is set in the arbitrary file name mode.

As shown in FIG. 9, at first, in step S300, the interface section 150 accepts a request for writing an existing external file in the storage medium 3 from the external applications 180, 182 (for instance, FTP PUT command).

For instance, when a video and audio data stored in the external device 20 such as a personal computer is copied into or transferred to the storage medium 3 in the image pickup device 10 connected to the external device 20, a user drags and drops the file to be copied or transferred from a directory in the external device 20 to a directory in the storage medium 3 by referring a file name list display provided by the external application 182. In response to this user's input, the external applications 180, 182 transmit a request for writing the file in the storage medium 3 to the interface section 150, and the interface section 150 accepts this request for wiring the file.

In step S302, the file generating section 160 in the interface section 150 recognizes a file name of the file specified by the external applications 180, 182 as a target for writing, and determines whether the file name specified in step S304 follows the existing denomination rule permitted in the file system 140 or not (namely, whether the file name have has a corresponding standard file name or not).

As a result of determination, when it is determined that the file name follows the denomination rule, since the file name for the target file for writing is a standard file name which the file system 140 can cope with, and the processing flows to step 306. In step S306, the file generating section 160 of the interface section 150 instructs the file system 140 to write the write target file with the standard file name originally assigned to the file in the storage medium 3. As a result, the file system 140 newly generates the file as a target for writing with the standard file name and writes the file in the storage medium 3 (step S314).

On the other hand, when it is determined in step S304 that the file name of the file as a target for writing does not follow the denomination rule, since the file name is an arbitrary file name which the file system 140 can not cope with, the processing flows to step S308. The file generating section 160 generates a new standard file name following the existing denomination rule for the purpose to assign the file name to the file as a target for writing (step S308), and registers the writing target file in the file name correspondence table 7 by describing a correspondence (Alias element) between the newly generated standard file name and the arbitrary file name originally assigned to the file (step S310).

In step S312, the file generating section 160 gives an instruction for writing the file as a target for writing with the newly generated standard file name in the storage medium 3 to the file system 140. As a result, the file system 140 generates the file as a target for writing having the newly generated standard file name in the storage medium 3 (step S314).

In the processing for writing a file as described above, even a file having an arbitrary file name which the file system 140 can not treat can be written in the storage medium 3 by assigning an appropriate standard file name to the file with the interface section 150 and registering the standard file name in the file name correspondence table 7. With the operations as described above, the file can be copied or transferred from the external device 20 to the storage medium 3 in the image pickup device 10 without giving any damage to the original file name.

<8. Processing for Checking Consistency of a File Name Correspondence Table>

Next, description is provided for the processing for checking consistency between contents described in the file name correspondence table 7 and contents of an actual file stored in the storage medium 3.

The embodiment of the present invention was made so that the standard file name mode and the arbitrary file name mode can coexist without any contradiction. In the image pickup device 10 according to the embodiment of the present invention described above, all operations in the arbitrary file name mode can be enabled simply by adding new operations of the interface section 150 making use of the file name correspondence table 7.

On the other hand, an image pickup device based on the technology in the past (which does not have the interface section 150 and has only the file system 140) can not recognize the file name correspondence table 7 and can support only the standard file name mode. Herein it is assumed a case in which the storage medium 3 having the interface as shown in FIG. 6 is set in the type of image pickup device in the past, a video and audio file having the file name of "C00001.MXF" in which the Mt. Fiji is shot and recorded is deleted, and a video and audio file having the file name of "C0001.MXF" in which the Mt. Rokko is shot and recorded is again generated. In this case, when the storage medium 3 is set the image pickup device 10 compatible with the arbitrary file name mode, since the file name "Fuji" is still correlated to the standard file name "C0001" in the file name correspondence table 7 stored in the storage medium 3, when the method described above is applied as it is, an arbitrary file name of "Fuji.MXF" is denominated in spite of the fact that the video and audio file records images of the Mt. Rokko.

To prevent the trouble as described above, a target attribute (file identifier) is added to each Alias element in the file name correspondence table 7 according to the embodiment of the present invention, and a correspondence among standard file names, arbitrary file names, and file identifiers is described. Namely, a file identifier (such as UMID) described as a target attribute value is a unique value, so that each value can accurately be identified and differentiated from other files. Therefore, even when both the standard file name of a video and audio file stored in the storage medium 3 and a standard file name described in the file name correspondence table 7 are the same "C0001.MXF", when the file identifier for the video and audio file is different from that described in the file name correspondence table 7, the two files are not regarded as the same ones.

To prevent the trouble as described above, in the image pickup device 10 according to the embodiment, when the file name correspondence table 7 is read in the arbitrary file name mode (for instance, for loading the storage medium 3, or for starting the arbitrary file name mode) in the arbitrary file name mode, whether the video and audio file specified in the file name correspondence table 7 is actually present in the storage medium 3 or not can be confirmed not only by checking the original attribute value (the standard file name) but also by checking the target attribute value (file identifier), and when it is determined that the file is not present, the Alias element itself in the file name correspondence table 7 is aborted. As a result, in the example described above, items relating to the video and audio file which is not actually present in the storage medium 3 is deleted from the file name correspondence table 7, and as a result, the arbitrary file name of "Fiji.MXF" is aborted, and the standard file name of "C0001.MXF" is displayed. Thus, the consistency between a file with the arbitrary file name described in the file name correspondence table 7 and a file stored in the storage medium 3 can be assured.

Figures 10, 11:
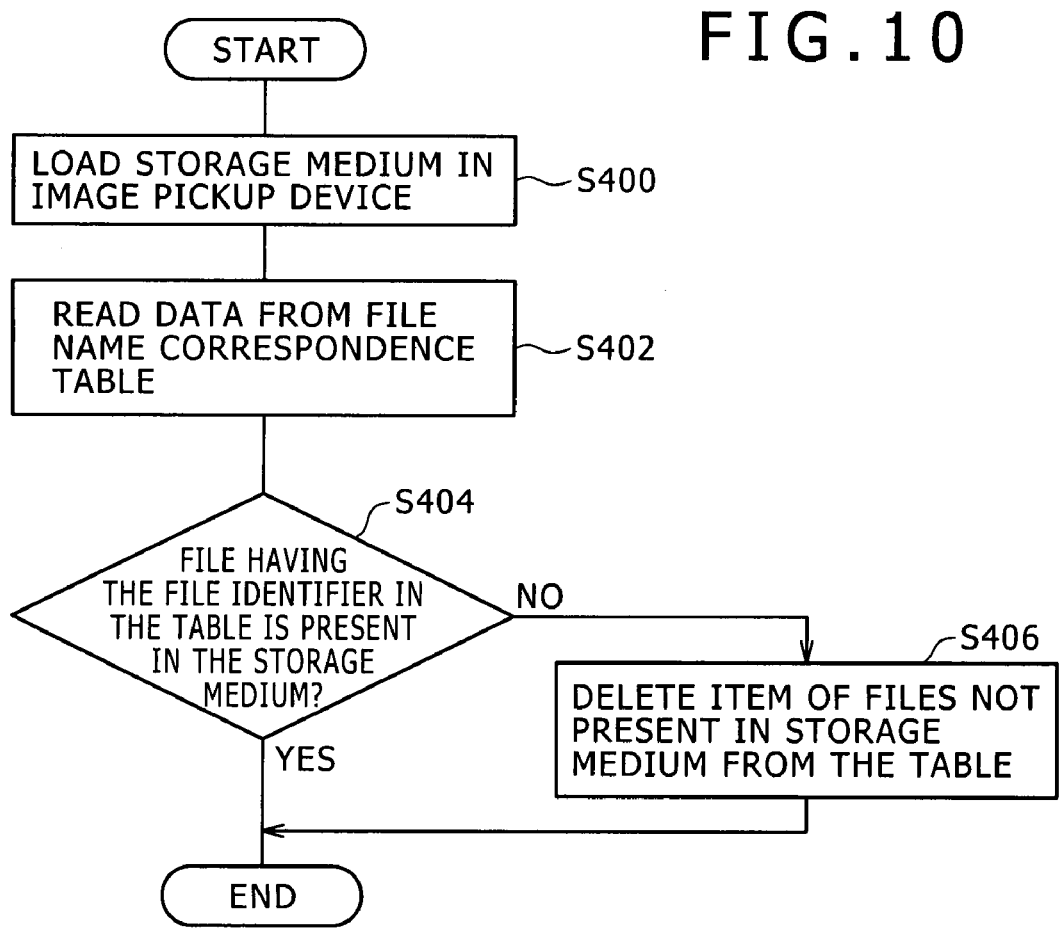
FIG. 10 is a flow chart illustrating a flow of processing for checking consistency of contents in a file name correspondence table in the file management method according to the present embodiment.
FIG. 11 is an explanatory view illustrating an example of description in which arbitrary file names in the file name correspondence table have been changed.

Now description is provided for a flow of processing for checking the consistency between description contents in the file name correspondence table 7 and files stored in the storage medium 3 in the file management method according to the present embodiment. FIG. 10 is a flow chart illustrating a flow of processing for checking the consistency of contents of description in the file name correspondence table 7.

As shown in FIG. 10, when the storage medium 3 such as an optical disk is loaded in the image pickup device 10 (step S400), the table management section 152 in the interface section 150 reads out the file name correspondence table 7 from the storage medium 3 (step S402). The timing for reading out the file name correspondence table 7 may be when starting the arbitrary file name mode in the image pickup device 10 (for starting the image pickup device 10, or when the operating mode of the image pickup device started up is switched from the standard file name mode to the arbitrary file name mode).

In step S404, the table management section 152 determines whether a file having a file identifier (for instance UMID) described in the file name correspondence table 7 is actually present in the storage medium 3 or not. More specifically, the table management section 152 verifies all of the file identifiers described in the file name correspondence table 7 to the file identifiers added to all of the files described in the storage medium 3 to determine that the files with the file identifiers described in the file name correspondence table 7 are actually described in the storage medium 3.

When it is determined that a file having the file identifier described in the file name correspondence table 7 is not present in the storage medium 3, the table management section 152 deletes all items (Alias elements) relating to the file from the file name correspondence table 7 (step S406).

As described above, in the processing for checking consistency of the file name correspondence table according to the embodiment, consistency between files actually stored in the storage medium 3 and files with the correspondence described in the file name correspondence table 7 is checked, and for a file not present in the storage medium 3, corresponding items relating to the file are deleted from the file name correspondence table 7. With this operation, contents of description in the file name correspondence table 7 can be synchronized to the files actually present in the storage medium 3. It is to be noted that, although file identifiers are used as a criteria for determination of file consistency in the example shown in FIG. 10, the embodiment of the present invention is not limited to the example, and a standard file name, or both of a file identifier and a standard file name may be used as a criteria for determination.

<9. Processing for Changing Arbitrary File Names Collectively>

Next the processing for changing arbitrary file names described in the file name correspondence table 7 collectively is described below. As described below, all information relating to an arbitrary file name is described in the file name correspondence table 7. By nature, the file name correspondence table 7 can be hidden as a portion of an extended file system, but in this embodiment, the file name correspondence table 7 is intentionally disclosed to the external applications 180, 182 as shown in FIG. 6 so that contents of description in the file name correspondence table 7 can be changed by the external applications 180, 182. As a result, such operations as addition or change of arbitrary file names to all of the video and audio files in the storage medium 3 can be performed collectively by the external applications 180, 182.

Figure 12:
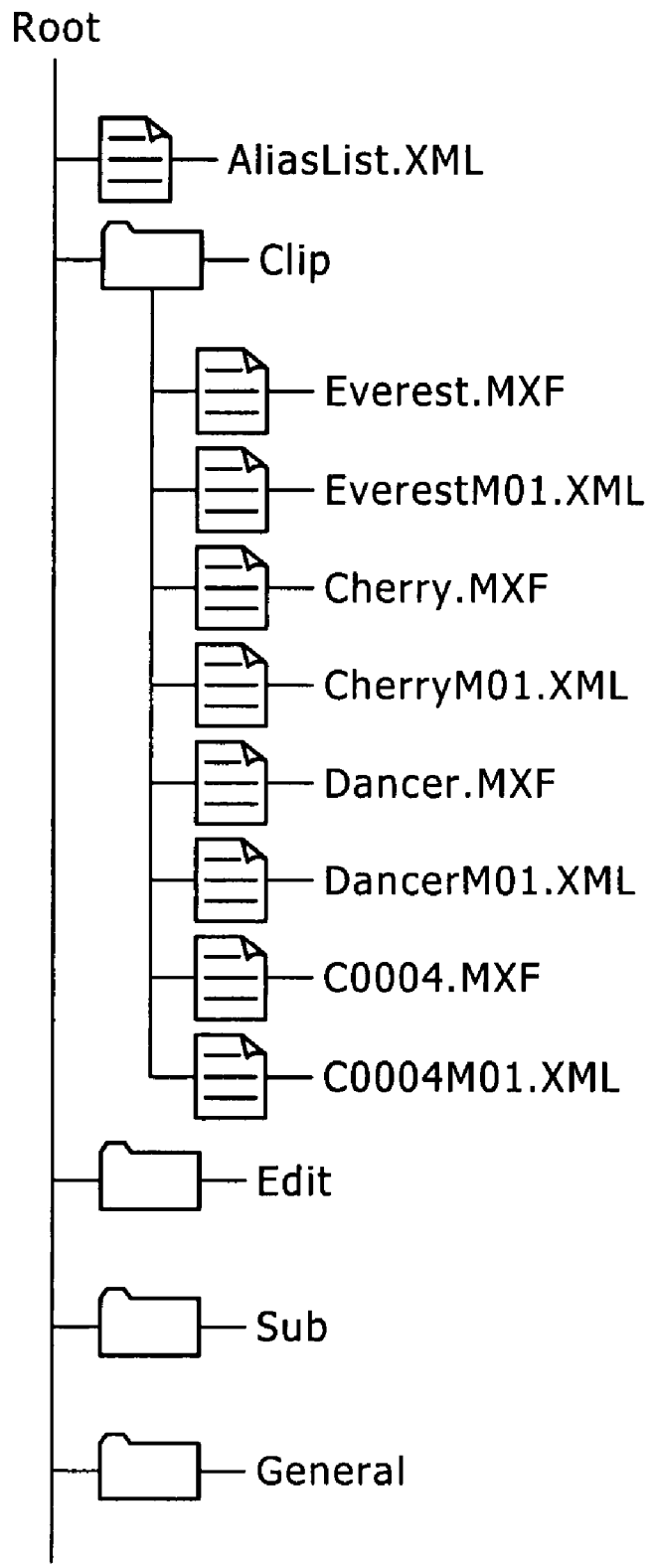
FIG. 12 is an explanatory view illustrating file name list display based on the file name correspondence table in FIG. 11.

A specific example of the processing for changing the arbitrary file names collectively is described with reference to FIG. 11 and FIG. 12. FIG. 11 is an explanatory view illustrating an example of description in which the arbitrary file names described in the file name correspondence table 7 shown in FIG. 4 are changed. FIG. 12 is an explanatory view illustrating an example of file name list display based on the file name correspondence table 7 shown in FIG. 11.

When the file name correspondence table 7 is changed collectively, the external applications 180, 182 accesses the file name correspondence table 7 in the storage medium 3 via the interface section 150 to read out the file name correspondence table 7 (Refer to FIG. 4).

Then, the external applications 180, 182 change only items (value attribute values) of an arbitrary file name for each Alias element to new arbitrary file names to generate the file name correspondence table 7 having the description contents as shown in FIG. 11.

In the example shown in FIG. 11, the arbitrary file names of "Fuji", "Sakura", and "Geisha" before the change are changed to new arbitrary file names of "Everest", "Cherry", and "Dancer" respectively. Each of the new arbitrary file names is decided, for instance, based on a user's input.

Then the external applications 180, 182 overwrite the files in the file name correspondence table 7 with the arbitrary file names having been changed in the files in the old file name correspondence table 7 positioned, for instance, just below Root in the storage medium 3. With this operation, the interface for the file name list shown in FIG. 6 is immediately changed to that shown in FIG. 12.

As described above, in this embodiment, since a plurality of file names in the file name correspondence table 7 can be changed collectively by the external applications 180, 182, addition and change of an arbitrary file name can be performed more quickly as compared to a case in which each discrete file is changed one by one under corporation between the interface section 150 and the external applications 180, 182.

For instance, in a case where a file stored in the storage medium 3 is copied into another storage medium 3, if it is necessary to display, in either the "standard file name mode" or in the "arbitrary file name mode", the same file name as that in the original storage medium 3 by using the reproduced storage medium 3 for insuring the background compatibility, at first, a video and audio file is copied in the reproduced storage medium 3 in the "standard file name mode", and then the video and audio file is subjected to a renaming operation to reflect the arbitrary file name assigned to the video and audio file (namely the file name correspondence table 7 is generated in the copied storage medium 3 and a correspondence between the standard file name and the original arbitrary file name is described).

In this step, the renaming operation can easily be carried out by copying the file name correspondence table 7 from the original storage medium 3 to the reproduced storage medium 3 under support by the function for changing arbitrary file names collectively.

The image pickup device 10 as a file management apparatus according to the present embodiment and the file management method using the image pickup device 10 were described in detail above. In the present embodiment, the interface section 150 is provided between the file system 140 and the external applications 180, 182, and the file name correspondence table 7 describing a correspondence between standard file names of files stored in the storage medium 3 and arbitrary file names separately assigned to the files respectively is generated and managed by the interface section 150 so that the standard file names and the arbitrary file names can be converted to and from each other. Because of the functional configuration, it is possible for the file system 140 capable of treating only standard file names following the existing denomination rule to cope with arbitrary file names having a higher degree of freedom.

For instance, by converting a standard file name output by the interface section 150 from the file system 140 to an arbitrary file name based on the file name correspondence table 7, it becomes possible to display the arbitrary file name on the side of the external applications 180, 182. Furthermore, even when a file to be accessed is specified by the external applications 180, 182 with an arbitrary file name, the file system 140 can access the desired file using the standard file name by converting the arbitrary file name to the standard file name based on the file name correspondence table 7.

As described above, since the file system 140 capable of treating only standard file names can treat also arbitrary file names with the embodiment of the present invention, compatibility between a file management apparatus (the image pickup device 10 in the present embodiment) and an operating environment for a personal computer can be improved. For instance, a user can use a file in the file management apparatus by using an external application for an existing general purpose personal computer, so that an external application for a new personal computer can easily be developed.

Furthermore, by adding the interface section 150 and the file name correspondence table 7 in the existing file system 140, compatibility with arbitrary file names can be realized relatively easily without changing the existing file system 140. Furthermore by turning ON or OFF functions of the interface section 150, an operating mode can freely be switched between the arbitrary file name mode compatible with arbitrary file names and the standard file name capable of treating only standard file names. Therefore, coexistence of the arbitrary file name mode and the standard file name mode is enabled in one file management apparatus without any contradiction. Because of the feature, needs of a user hoping to use the standard file name mode in the past and those of a user hoping to use the arbitrary file name mode allowing for a higher degree of freedom can be satisfied with one file management apparatus.

Furthermore, by storing files such as video and audio files and the file name correspondence table 7 relating to the file in one removable storage medium 3, it is possible for a plurality of devices to share the files and the file name correspondence table as one set, which is convenient for file management. Furthermore, for instance, when loading the storage medium 3 in a file management apparatus capable of also treating arbitrary file names, by checking the consistency between description in the file name correspondence table 7 and files actually present in the storage medium 3 based on the standard file names and/or file identifiers described in the file name correspondence table 7, the compatibility with both the two types of file names, namely standard file names and arbitrary file names can advantageously be realized. Because of the feature, even when compatibility between files stored in the storage medium 3 and the file name correspondence table 7 is lost as a result of change of file names in the storage medium 3 in the file management apparatus in the past not capable of treating arbitrary file names (for instance, when all files stored in the storage medium 3 are deleted and then new video and audio files are generated and recorded with the same standard files), in the file management apparatus capable of treating arbitrary file names, it is possible to correct description in the file name correspondence table 7 by detecting change of file names in the storage medium 3 based on file identifiers. Because of the feature, it is possible to display an arbitrary file name applicable to a file which is actually present in the storage medium 3 or to access the file by using the arbitrary file name.

A preferable embodiment the present invention was described above with reference to the related drawings, but it is needless to say that the embodiment of the present invention is not limited to this example. It is clear that those skilled in the art can anticipate various changes and modifications of the embodiment of the present invention within the scope defined in the appended claims, and it is understood that the changes and modifications are included within the scope of the present invention.

Description of the embodiment above assumes a case in which the file management apparatus according to the embodiment of the present invention is applied to the image pickup device 10, but the embodiment is not limited to this configuration. The file management apparatus according to the embodiment of the present invention can be applied to electronic equipment and devices treating data files including, but not limited to, computers such as personal computers (regardless of whether the computers are of the laptop type or of the desk-top type), image editors for business use, broadcasting equipment for business use, image recorders/reproducers for DVD recorders/players, digital cameras, video cameras, mobile telephones, DPAs (Personal Digital Assistants), portable video/audio players, game machines for home use, portable game machines, intelligent electronic home appliances, and electronic dictionaries.

Although arbitrary file names are assigned based on an input from a user in the embodiment described above, the embodiment is not limited to this configuration. The arbitrary file names as used herein include any file name not following the denomination rule for the file system 140, and may be file names automatically assigned according to a different denomination rule for a file system other than the file system 140. There is not need for introducing any restriction over a correspondence between arbitrary file names and standard file names.

In the embodiment described above, files such as video and audio files and the file name correspondence table 7 are stored in the same storage medium 3, but the embodiment is not limited to this configuration, and the files and the file name correspondence table 7 may be stored in difference storage media respectively.

What is claimed is:

1. A file management apparatus configured to enable a file system capable of treating only a file with a standard file name following the existing file denomination rule to allow for use of an arbitrary file name separately assigned to the file, the file name management apparatus comprising:
- a table management section that manages a file name correspondence table in which correspondence between standard file names assigned to one or more files stored in a storage medium and arbitrary file names separately assigned to the files is described;
- a file name display control section that determines, when an external application displays a file name of a file stored in a storage medium, whether an arbitrary file name is assigned to the file based on the file name correspondence table, converts, when an arbitrary file name is assigned to the file, a standard file name acquired from the file system to the arbitrary file name based on the file name correspondence table and displays the arbitrary file name, or displays the standard file name acquired from the file system when an arbitrary file name is not assigned to the file;
- a file access control section that gives an instruction for accessing to an access target file to the file system by using, when an external application accesses a file store in a storage medium and specifies an access target file with an arbitrary file name, a standard file name converted from the arbitrary file name based on the file name correspondence table, or by using, when the access target file is specified with a standard file name, the standard file name; and
- a mode switching section that switches an operating mode between the arbitrary file name mode in which an arbitrary file name is acknowledged and the standard file name mode in which an arbitrary file name is not acknowledged by turning ON or OFF functions of the file name display control section and the file access control section.

2. The file management apparatus according to claim 1, wherein a correspondence between the standard files and the arbitrary file names assigned to files stored in the storage medium and file identifiers uniquely assigned to the files is described in the file name correspondence table, and
the table management section determines whether a file corresponding to an arbitrary file name described in the file name correspondence table is present in the storage medium or not based on the file identifier described in the file name correspondence table as well as on a file identifier assigned to the filed stored in the storage medium.

3. The file management apparatus according to claim 1, wherein the file name display control section notifies presence of the file name correspondence table to the external application in the arbitrary file name mode, but does not notify presence of the file name correspondence table to the external application, and
the external application determines, based on presence or absence of the file name correspondence table, whether the operating mode is set in the arbitrary file name mode or in the standard file name mode.

4. The file management apparatus according to claim 1, wherein, when assignment of a new arbitrary file name to a file with a standard file name already assigned thereto is requested, the table management section correlates the standard file name and the arbitrary file name to each other and describes the correspondence in the file name correspondence table, and
updates, when change of an arbitrary file name already assigned to a file is requested, the arbitrary file name described in the file name correspondence table, and
deletes, when a file having a standard file name or a file identifier described in the file name correspondence table is not present in the storage medium, descriptions relating to the file from the file name correspondence table.

5. The file management apparatus according to claim 1, wherein the file name correspondence table is accessed from the external application.

6. The file management apparatus according to claim 1, wherein the file name correspondence table is stored together with the file in the same storage medium.

7. The file management apparatus according to claim 6, wherein the storage medium is a detachable removable storage medium on the file management apparatus.

8. A file management method enabling a file system capable of treating only a file with standard file name following the existing file denomination rule to allow for use of an arbitrary file name separately assigned to the file, and the file management method comprising the steps of:
- managing a file name correspondence table between standard file names assigned to one or more files stored in a storage medium and arbitrary file names separately assigned to the files is described;
- switching between an arbitrary file name mode allowing for use of an arbitrary file name and a standard file name mode not allowing for use of an arbitrary file name;
- determining, when an external application displays a file name of a file stored in a storage medium in the arbitrary file name mode, whether an arbitrary file name has been assigned to the file or not based on the file name correspondence table, converting a standard file name acquired from the file system to the arbitrary file name based on the file name correspondence table and displaying the arbitrary file name, or displaying the standard file name acquired from the file system when any arbitrary file name has been assigned to the file; and
- giving an instruction for accessing an access target file to the file system, when an external application accesses a file stored in the storage medium in the arbitrary file name mode, by using, when the access target file is specified with an arbitrary file name, a standard file name generated by converting the arbitrary file name based on the file name correspondence table, and by using, when the access target file is specified with a standard file name, the standard file name.

9. A program enabling a file system capable of treating only a file with standard file name following the existing file denomination rule to allow for use of an arbitrary file name separately assigned to the file, and the program enables a computer to function as:
- a table management section that manages a file name correspondence table in which correspondence between standard file names assigned to one or more files stored in a storage medium and arbitrary file names separately assigned to the files is described;

a file name display control section that determines, when an external application displays a file name of a file stored in a storage medium, whether an arbitrary file name is assigned to the file based on the file name correspondence table, converts, when an arbitrary file name is assigned to the file, a standard file name acquired from the file system to the arbitrary file name based on the file name correspondence table and displays the arbitrary file name, or displays the standard file name acquired from the file system when an arbitrary file name is not assigned to the file;

a file access control section that gives an instruction for access to an access target file to the file system by using, when an external application accesses a file store in a storage medium and specifies an access target file with an arbitrary file name, a standard file name converted from the arbitrary file name based on the file name correspondence table, or by using, when the access target file is specified with a standard file name, the standard file name; and a mode switching section that switches an operating mode between the arbitrary file name mode in which an arbitrary file name is acknowledged and the standard file name mode in which an arbitrary file name is not acknowledged by turning ON or OFF functions of the file name display control section and the file access control section.

* * * * *